United States Patent
Falstrup et al.

(10) Patent No.: US 10,354,547 B1
(45) Date of Patent: Jul. 16, 2019

(54) APPARATUS AND METHOD FOR VIRTUAL TEST DRIVE FOR VIRTUAL REALITY APPLICATIONS IN HEAD MOUNTED DISPLAYS

(71) Applicant: Relay Cars LLC, Rancho Dominguez, CA (US)

(72) Inventors: David Falstrup, Rancho Dominguez, CA (US); Thom Denick, Rancho Dominguez, CA (US); Aaron Johnson, Rancho Dominguez, CA (US); Seth Peterson, Rancho Dominguez, CA (US); Alex McClain, Rancho Dominguez, CA (US); Paul Maxon, Rancho Dominguez, CA (US); Pat Hadnagy, Los Angeles, CA (US); Claudia Nefately Ambriz, Rancho Dominguez, CA (US)

(73) Assignee: Relay Cars LLC, Rancho Dominguez, CA (US)

(*) Notice: Subject to any disclaimer, the term of this patent is extended or adjusted under 35 U.S.C. 154(b) by 236 days.

(21) Appl. No.: 15/659,892

(22) Filed: Jul. 26, 2017

Related U.S. Application Data

(60) Provisional application No. 62/368,802, filed on Jul. 29, 2016.

(51) Int. Cl.
| | |
|---|---|
| *G09B 9/05* | (2006.01) |
| *G06F 3/01* | (2006.01) |
| *G02B 27/01* | (2006.01) |
| *G06T 15/00* | (2011.01) |
| *G09G 5/00* | (2006.01) |
| *G09B 9/00* | (2006.01) |

(52) U.S. Cl.
CPC .......... *G09B 9/05* (2013.01); *G02B 27/0172* (2013.01); *G06F 3/011* (2013.01); *G06T 15/00* (2013.01); *G09B 9/00* (2013.01); *G09G 5/00* (2013.01)

(58) Field of Classification Search
CPC ........ G09B 9/05; G02B 27/0172; G06F 3/011
See application file for complete search history.

(56) References Cited

U.S. PATENT DOCUMENTS

| | | | | | |
|---|---|---|---|---|---|
| 5,583,526 | A | * | 12/1996 | Socks | G06F 3/011 345/7 |
| 6,141,034 | A | * | 10/2000 | McCutchen | G02B 27/22 348/36 |
| 7,639,208 | B1 | * | 12/2009 | Ha | G02B 27/0172 345/204 |

(Continued)

FOREIGN PATENT DOCUMENTS

| | | |
|---|---|---|
| CN | 103479138 A | 1/2014 |
| DE | 102014010309 | 1/2016 |

(Continued)

*Primary Examiner* — Xuan M Thai
*Assistant Examiner* — Sadaruz Zaman
(74) *Attorney, Agent, or Firm* — Socal IP Law Group LLP; Mark Andrew Goldstein

(57) ABSTRACT

A novel, useful and non-obvious method for the creation of virtual test drives in a virtual reality application using a layered panorama method. This novel approach utilizes the stereoscopic panoramic vehicle interior images layered over a 360 looping video, inclusive of dynamically reflecting car mirrors, animated steering wheels and speedometer for an immersive realistic, test drive experience.

8 Claims, 3 Drawing Sheets

(56) References Cited

U.S. PATENT DOCUMENTS

| | | | | |
|---|---|---|---|---|
| 7,761,269 | B1* | 7/2010 | Kraal | G06F 3/011 |
| | | | | 703/1 |
| 9,908,482 | B1* | 3/2018 | Falstrup | B60R 11/04 |
| 2002/0167589 | A1* | 11/2002 | Schofield | B60N 2/002 |
| | | | | 348/148 |
| 2008/0246759 | A1* | 10/2008 | Summers | G06F 3/0304 |
| | | | | 345/420 |
| 2011/0175752 | A1* | 7/2011 | Augst | B60R 1/00 |
| | | | | 340/905 |
| 2014/0333729 | A1* | 11/2014 | Pflug | G06T 15/20 |
| | | | | 348/47 |
| 2015/0104757 | A1* | 4/2015 | Moncrief | G09B 9/302 |
| | | | | 434/38 |
| 2018/0191954 | A1* | 7/2018 | Pan | H04N 5/23238 |
| 2019/0045178 | A1* | 2/2019 | Lutter | H04N 19/172 |
| 2019/0089940 | A1* | 3/2019 | Zhang | G06T 3/0087 |

FOREIGN PATENT DOCUMENTS

| | | |
|---|---|---|
| GB | 2535729 | 8/2016 |
| WO | WO0161672 | 8/2001 |

* cited by examiner

APPARATUS AND METHOD FOR VIRTUAL TEST DRIVE FOR VIRTUAL REALITY APPLICATIONS IN HEAD MOUNTED DISPLAYS

CROSS-REFERENCE TO RELATED APPLICATION

This patent application claims priority to Provisional Application No. 62/368,802 filed on Jul. 29, 2016.

BACKGROUND OF THE INVENTION

1. Field of the Invention

The present invention relates to the field of virtual reality applications utilizing a head mounted display and in particular, the use of the virtual reality application to create a virtual test drive of a vehicle.

2. Description of the Prior Art

The following six patents and published patent applications are the closest prior art known to the inventors:
1. U.S. Pat. No. 5,583,526 issued to Kenric P. Socks et al. on Dec. 10, 1996 for "Hand Calibration System for Virtual Reality Vehicle Simulator" (hereafter the "Socks Patent");
2. U.S. Pat. No. 7,761,269 issued to Juliet C. Kraal et al. on Jul. 20, 2010 for "System and Method of Subjective Evaluation of a Vehicle Design Within a Virtual Environment Using a Virtual Reality" (hereafter the "Kraal Patent");
3. PCT Publication No. WO 01/61672 to Steven Low et al. on Aug. 23, 2001 for "Virtual Reality Testdrive System" (hereafter the "Low PCT Publication");
4. Chinese Patent No. CN103479138A to Luo Yi on Jan. 1, 2014 for "Interactive Virtual Reality Car Show Platform" (hereafter the "Yi Chinese Patent");
5. German Patent No. DE102014010309 issued to Marcus Kühne on Jan. 14, 2016 for "Displaying Additional Content in a Virtual Scene" (hereafter the "Kuhn German Patent");
6. UK Patent Application No. GB2535729 to Christopher James Whiteford et al. on Aug. 31, 2016 for "Immersive Vehicle Simulator Apparatus and Method" (hereafter the "Whiteford UK Patent Application").

The Sock Patent discloses a virtual reality vehicle simulator including a simulation of a person sitting in a car seat.

The Kraal Patent discloses a method for evaluating a vehicle design.

The Low PCT Publication discloses in general a virtual reality system simulating a vehicle including a visual display built into a screen in a helmet worn by a user The Yi Chinese Patent discloses an interactive virtual reality car show platform simulating cars in a virtual reality setting.

The Kühne German Patent discloses an interactive device where a seller of a vehicle can communicate with a prospective buyer.

The Whiteford UK Application discloses a vehicle simulator to enable simulation of controlling a vehicle.

To the best of the present inventors' knowledge, the above identified references are the only third party relevant references.

SUMMARY OF THE INVENTION

The present invention includes a novel, useful and non-obvious apparatus and method for the creation of virtual test drives in a virtual reality application using a proprietary layered panorama method created by the present inventors and also described and claimed in co-pending patent application Ser. No. 15/223,638 for LAYERED PANORAMAS FOR VIRTUAL REALITY assigned to the same assignee as the present invention. This novel approach utilizes proprietary stereoscopic panoramic vehicle interior images layered over a 360 degree looping video. Also included are dynamically reflecting car mirrors, animated steering wheels and a speedometer for an immersive, realistic test drive experience.

It is an object of the present invention to provide a unique method to allow a user to take a test drive without ever having to actually get in the physical vehicle and drive it. The present invention provides maximum flexibility for virtual test driving a large number of vehicles in various locations in a matter of minutes, thereby increasing the user's interest and excitement over a vehicle of a user's choice.

It is an additional object of the present invention to create a method which allows for the virtual reality (VR) application to create a virtual test drive for car shoppers interested in experiencing their vehicle of choice in a test drive experience.

It is a further object of the present invention to enable the exterior location created in the virtual test drive to be replaced with another location to allow a user to experience a variety of virtual test drives and to allow the user to switch vehicles to test drive other vehicles.

Described in detail, the present invention is a method comprising:
 a. incorporating a pre-rendered proprietary driving video to facilitate a dynamic immersion in a test drive experience in a variety of environments for a car;
 b. including an interior stereo panoramic photograph of a car interior which includes a proprietary use of a cube-based panoramic photograph with one photograph for a left eye and one photograph for a right eye;
 c. rendering the car windows transparent to allow viewing from the car interior into the virtual reality test drive video environment;
 d. placing the vehicle within the virtual environment such as a photograph selected from the group consisting of an urban location and a rural location;
 e. test driving the car in advance of a virtual experience to match the stereo setup of the interior photograph with exterior video projected onto a geometry selected from the group consisting of a dome geometry and a cube geometry;
 f. painting light layers onto surfaces to reflect a color of the test drive video environment;
 g. utilizing shader images to create an alpha mask of a mirror image to only show a reflection in mirror areas;
 h. creating a script assigning moving video texture as the main texture on a custom shader combined with an alpha mask to display a perfect reflection of a video environment in the mirrors;
 i. adding a moving steering wheel to achieve the effect of a virtual test drive;
 j. separating the steering wheel from the background image so that the steering wheel is rotated with animation to emulate the effect of a steering wheel; and
 k. wherein the method enables a virtual test drive of a car without ever actually driving an actual car.

Described more broadly, the present invention is a method comprising:

a. utilizing a pre-rendered proprietary driving video to facilitate dynamically immersion in a test drive experience in a variety of environments for a vehicle;
b. including several levels of immersion elements to be broken out from a basic default stereoscopic panoramic photograph;
c. a base setup for an interior stereo panoramic photograph of a vehicle selected from the group consisting of a cube-based panoramic photograph with one photograph for a left eye and one photograph for a right eye;
d. rendering the vehicle windows transparent to facilitate viewing a test drive video environment from an interior of the vehicle; and
e. matching a setup of an interior of a vehicle with an exterior projected video selected from the group consisting of a dome geometry or a cube geometry, the exterior video selected from the group consisting of stereo and mono to enable a virtual test drive of a vehicle.

Described most broadly, the present invention is a method comprising:
a. a virtual test drive of a vehicle for virtual reality applications for display through a head mounted display;
b. incorporating a virtual reality application using a layered panorama method including stereoscopic panoramic vehicle interior images layered over a 360 looping video, inclusive of dynamically reflecting car mirrors, animated steering wheels and speedometer for an immersive realistic, test drive experience; and
c. creating an exterior location image virtually viewed through vehicle windows and mirrors.

Further novel features and other objects of the present invention will become apparent from the following detailed description and discussion.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention.

Overview—Virtual Test Drive for Virtual Reality Applications for Display Through a Head Mounted Display (HMD).

A novel, useful and non-obvious method for the creation of virtual test drives in a virtual reality application using a layered panorama method. This novel approach utilizes the stereoscopic panoramic vehicle interior images layered over a 360 looping video, inclusive of dynamically reflecting car mirrors, animated steering wheels and speedometer for an immersive realistic, test drive experience.

Features:

This method allows the virtual reality (VR) application to create a virtual test drive for car shoppers interested in experiencing their vehicle of choice in a test-drive like manner. The exterior location can be replaced with another to allow the user to experience a variety of virtual test drives, and the user can switch vehicles to test drive other vehicles.

Processes:

The present invention application allows reflections in vehicle mirrors through the following key processes:

1. The present invention utilizes a pre-rendered proprietary driving video to facilitate dynamically immersing a customers in a "test drive" experience in a variety of environments for a car. The present invention includes several levels of "immersion elements" to be broken out from a basic default stereoscopic panoramic photograph.

2. The base setup for creating the above-described experience is an interior stereo panoramic photograph of a car interior. In one application, the present invention incorporates a proprietary use of a cube-based panoramic photograph with one photograph for the user's left eye and one photograph for a user's right eye, as described and claimed in co-pending patent application Ser. No. 15/081,752 for "METHOD AND APPARATUS FOR CREATION THREE-DIMENSIONAL PHOTOGRAPHY OF AUTOMOTIVE VEHICLE INTERIORS FOR USE WITH A VIRTUAL REALITY DISPLAY" assigned to the assignee as the present invention. The car windows are rendered transparent to allow the user to see out into the virtual reality test drive video environment.

Figure 1:
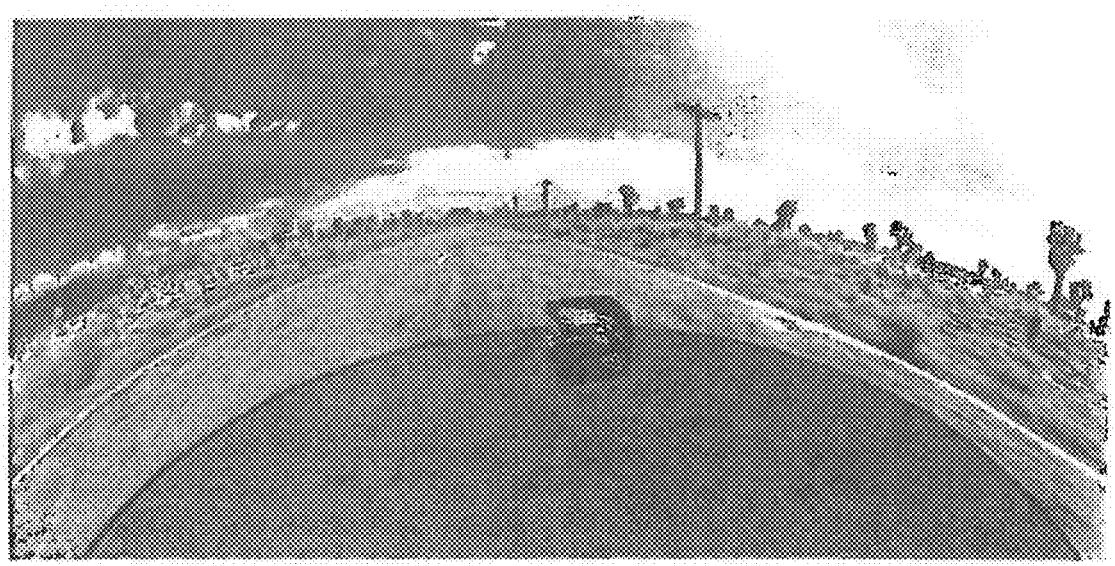
FIG. 1 is a photograph of a sample test drive environment.

Referring to FIG. 1, FIG. 1 is a photograph of a test drive environment where a vehicle is placed within the virtual environment which in the photograph is desert landscape.

The test drive video is rendered ahead of time to match the stereo setup of the interior photograph. The exterior video can be projected onto either a dome geometry, or a cube geometry. Since the distance of the objects in the video are likely far away from the driver, the video can be stereo or mono.

3. In addition to the base setup, the original stereoscopic panoramic video can have additional work done to enhance the realism of the experience. This includes painting light layers onto surfaces to reflect the color of the test drive video environment. A further step that can be performed is to take the video data and convert that data into an averaged color to apply on the light highlights within the car interior.

The following is the key code for switching out the video textures:

Renderer videoRenderer=
moviePlayer.m_TargetMaterial[0].GetComponent<Renderer>( );
leftMirror.material.mainTexture=videoRenderer.material- .
mainTexture;
rightMirror.material.mainTexture=videoRenderer.material.mainTexture;

4. Realistic mirrors can be achieved using common shader technology found in game engines. To achieve this, first an alpha mask must be created to represent the mirrors' position in the panorama. This is a large image that only contains two colors: white and transparency. The shader uses this image as a mask to only show the reflection in the mirror areas.

Once the main test drive video begins playing, a script assigns the moving video texture as the main texture on the custom shader. Combined with the Alpha Mask, this displays a perfect reflection of the video environment in the mirrors.

Figure 2:
FIG. 2 is a photograph of a sample mirror image where the mirrors are overlapped and are updated in real time with a test drive video.

Referring to FIG. 2, there is illustrated a photograph of a sample mirror image. In this embodiment, there are mirror overlays, and they are updated in real time with a test drive video.

Additionally, a color combine is applied to this video texture before it is applied to the mirrors to darken the video (to represent the normal dimming effect mirrors experience when reflecting light.)

5. Another immersion element that can be added is a moving steering wheel. To achieve this effect, an artist uses photo editing software to composite the wheel out of both the left and right images. (It is important to do this to both left and right eye images to preserve the stereoscopic effect.)

In addition to removing the wheel, the artist also needs to build a back area for the steering wheel. The amount of coverage required is based on how far the wheel needs to turn in each direction.

Once the wheel has been separated from the background image, its rotation can be animated within the game engine, emulating the effect of a real steering wheel.

Figure 3:
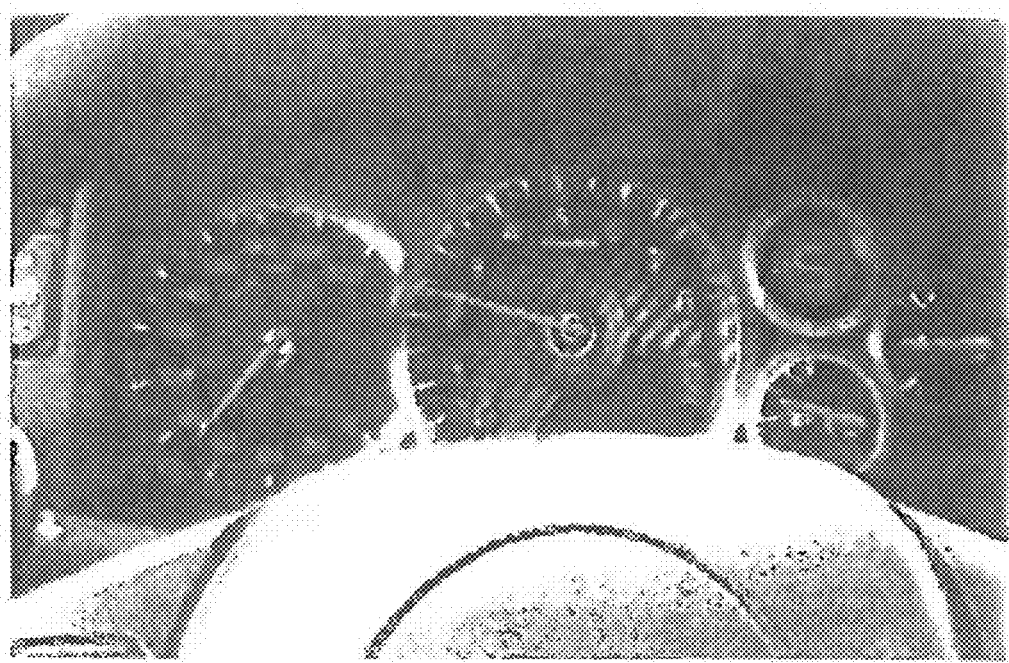
FIG. 3 is a photograph of the present invention applied to animate the vehicle gauges including, but not limited to, the speedometer, the tachometer, the odometer, the fuel gauge, the GPS screen, and the engine temperature.

Referring to FIG. 3, there is illustrated a photograph of the animation of the vehicle gauges including by way of example, the speedometer, the tachometer, the odometer, the fuel gauge, the GPS screen, and the engine temperature Benefits:

Included in the benefits of the present invention are the following:

This unique method allows the user to take a test drive without ever having to actually get in the physical vehicle and drive it. It provides maximum flexibility for virtually test driving a large number of vehicles in various locations in a matter of minutes, thereby increasing the user's interest and excitement over a user's vehicle of choice.

This method is not obvious as it requires the combination of many unique items and special programming to create and effectively deliver this experience with a photo-real vehicle interior.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A method comprising:
   a. incorporating a pre-rendered proprietary driving video to facilitate a dynamic immersion in a test drive experience in a variety of environments for a car;
   b. including an interior stereo panoramic photograph of a car interior which includes a proprietary use of a cube-based panoramic photograph with one photograph for a left eye and one photograph for a right eye;
   c. rendering the car windows transparent to allow viewing from the car interior into the virtual reality test drive video environment;
   d. placing the vehicle within the virtual environment such as a photograph selected from the group consisting of an urban location and a rural location;
   e. test driving the car in advance of a virtual experience to match the stereo setup of the interior photograph with exterior video projected onto a geometry selected from the group consisting of a dome geometry and a cube geometry;
   f. painting light layers onto surfaces to reflect a color of the test drive video environment;
   g. utilizing shader images to create an alpha mask of a mirror image to only show a reflection in mirror areas;
   h. creating a script assigning moving video texture as the main texture on a custom shader combined with an alpha mask to display a perfect reflection of a video environment in the mirrors;
   i. adding a moving steering wheel to achieve the effect of a virtual test drive;
   j. separating the steering wheel from the background image so that the steering wheel is rotated with animation to emulate the effect of a steering wheel; and
   k. wherein the method enables a virtual test drive of a car without ever actually driving an actual car.

2. A method comprising:
   a. a virtual test drive of a vehicle for virtual reality applications for display through a head mounted display;
   b. incorporating a virtual reality application using a layered panorama method including stereoscopic panoramic vehicle interior images layered over a 360 looping video, inclusive of dynamically reflecting car mirrors, animated steering wheels and speedometer for an immersive realistic, test drive experience; and
   c. creating an exterior location image virtually viewed through vehicle windows and mirrors.

3. The method in accordance with claim 2, further comprising: replacing said exterior location image with subsequent new exterior location images.

4. The method in accordance with claim 2, further comprising: replacing said vehicle with at least one new vehicle.

5. A method comprising:
   a. utilizing a pre-rendered proprietary driving video to facilitate dynamically immersion in a test drive experience in a variety of environments for a vehicle;
   b. including several levels of immersion elements to be broken out from a basic default stereoscopic panoramic photograph;
   c. a base setup for an interior stereo panoramic photograph of a vehicle selected from the group consisting of a cube-based panoramic photograph with one photograph for a left eye and one photograph for a right eye;
   d. rendering the vehicle windows transparent to facilitate viewing a test drive video environment from an interior of the vehicle; and
   e. matching a setup of an interior of a vehicle with an exterior projected video selected from the group consisting of a dome geometry or a cube geometry, the exterior video selected from the group consisting of stereo and mono to enable a virtual test drive of a vehicle.

6. The method in accordance with claim 5, further comprising:
   a. painting light layers onto surfaces to reflect a color of the test drive video environment; and
   b. utilizing shader images to create an alpha mask of a mirror image to only show a reflection in mirror areas.

7. The method in accordance with claim 6, further comprising: creating a script assigning moving video texture as the main texture on a custom shader combined with an alpha mask to display a perfect reflection of a video environment in the mirrors.

8. The method in accordance with claim 7, further comprising:
   a. adding a moving steering wheel to achieve the effect of a virtual test drive; and
   b. separating the steering wheel from the background image so that the steering wheel is rotated with animation to emulate the effect of a steering wheel.

* * * * *